PLUTONIUM-THORIUM ALLOYS

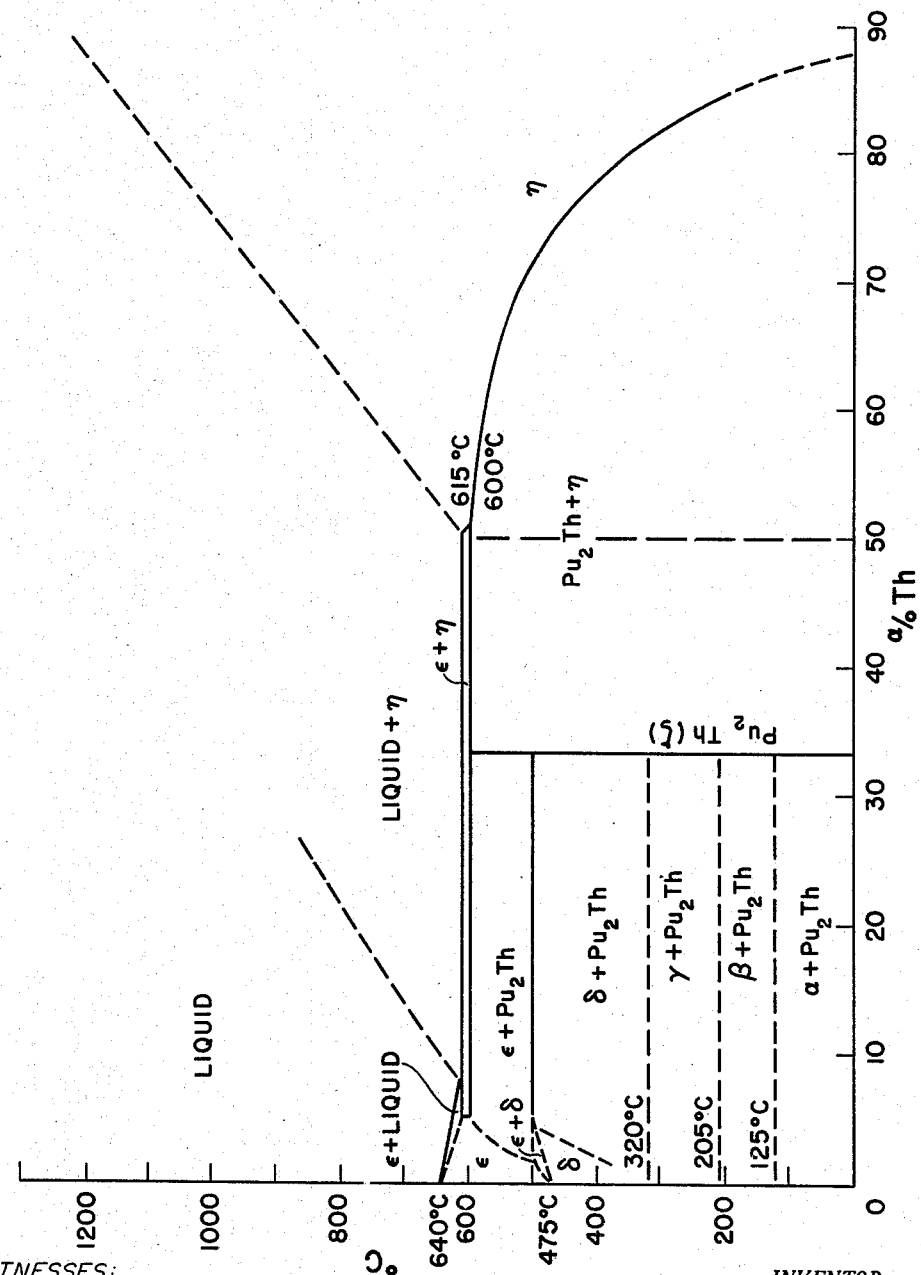

Fred W. Schonfeld, Los Alamos, N. Mex., assignor to the United States of America as represented by the United States Atomic Energy Commission Application October 29, 1957, Serial No. 693,220

2 Claims. (Cl. 75—122.7)

This invention relates to alloys of plutonium and in particular to an alloy of plutonium and thorium which may be used as a nuclear reactor fuel.

Although $U^{235}$ has generally been used as a fuel or active material in nuclear reactors, in certain nuclear reactor applications it is more desirable to use plutonium as the fissionable fuel. This is particularly true when the neutronic reactor is to operate with a neutron flux of fast or epithermal energies, such as, for example, the fast plutonium reactor described in AEC Report LA-1679.

Some nuclear reactors in addition to providing a useful neutron flux and/or heat source, provide a means for creating new active material or fuel within the reactor. These are known as breeder or converter reactors.

Pure plutonium may be used in a non-breeder fast reactor but its use has several disadvantages. One of these disadvantages is that the plutonium is consumed during the operation and the fuel element must be replaced or reprocessed periodically as a certain percentage of the plutonium is used.

Another disadvantage to the use of pure plutonium is that all of the heat is generated in a small volume of material thereby creating difficulties in heat removal.

Another disadvantage to the use of pure plutonium is that the metal has six solid allotropes, all of which have different densities, and therefore temperature changes cause discontinuous volume changes which can in turn cause loss of thermal contact or rupture of protective coatings.

The present invention is directed toward alleviating the disadvantages of using pure plutonium as fuel in a nuclear reactor and at the same time providing source material for conversion.

In order to reduce the intensity of heat generation in the plutonium, diluents may be used. However, most diluents used to increase the volume of the reacting mass of a nuclear reactor tend to moderate the neutrons thereby increasing the parasitic capture in plutonium 239 to form plutonium 240. Furthermore, diluents have also been found to create competing neutron reactions which also decrease the operating efficiency of the reactors.

Thorium, the alloying element of the present invention, does not substantially moderate fast or epithermal neutrons nor does it have any substantial parasitic neutron capture cross section for neutrons above thermal energies.

Further, from a metallurgical standpoint, such alloys of the prior art commonly have phase structures which give the metal undesirable physical properties. The metallurgical properties of the binary alloy of this invention make it a practical workable material having desirable characteristics for use in nuclear reactors. Further, alloys of this invention are resistant to radiation damage.

Under strong neutron bombardment alloys sometimes change phase thereby changing the physical properties. Since such phase changes are usually accompanied by changes in volume, it is usually desirable to start with an alloy in its most stable phase. Alloys in which the matrix phase possesses anisotropic properties resulting from complex crystal structures are often subject to radiation damage. Thermal spikes can cause anisotropic expansions and contractions which are in turn responsible for dimensional instabilities. Any change in volume of the reactor fuel elements results in a change in reactivity of the reactor which can be hazardous and undesirable. Further, phase changes can alter the physical shape of the fuel element which may result in the rupture of an element and consequent danger of radioactive contamination. Therefore any alloy of plutonium must improve the dimensional stability and physical characteristics (as compared to unalloyed metal) for use as a reactor fuel element. The plutonium-thorium alloys of the present invention provide such improvements.

It is important that any alloying element be such that no substantial neutron moderating effect is introduced since such moderation will decrease the general efficiency of the reactor by lowering the general flux energy of the neutrons and consequently will inhibit both the production of $Pu^{240}$ and the fission of $Pu^{239}$ and $Pu^{240}$.

It is also desirable to utilize as much of the neutron flux as possible without moderating effect or a large competing reaction rate in the production of other fissionable material.

By this invention alloys of plutonium and thorium may be produced which are machinable, easy to fabricate and may be cast free of cracks. Further, by providing the alloying element thorium, a source of fissionable material is added to the alloy in accordance with the reactions

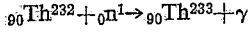

which decays by the reaction

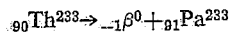

which in turn decays by the reaction

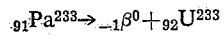

Conversion of $Th^{232}$ to $U^{233}$ is possible in both thermal and fast reactors, although the gain is generally larger in fast reactors. The $U^{233}$ produced by this reaction is essentially a thermal reactor fuel since its cross section for fast neutrons is exceedingly low. Thus it does not complete with the $Pu^{239}$ for neutrons.

Nuclear reactors in which the alloys of the present invention are particularly useful as fuel are well-known in the art. For example, AEC Report LA-1679, declassified March 11, 1957, the subject matter of which is incorporated herein by reference, describes a fast reactor in which the alloys of the present invention could be used.

It is therefore an object of this invention to provide an alloy of plutonium which is easy to fabricate and is phase stable.

Another object of this invention is to provide an alloy of plutonium and thorium which may be used as the fuel element of a nuclear reactor and particularly a fast reactor.

A still further object of this invention is to provide an alloy of plutonium and thorium which as a fuel element in a nuclear reactor provides a means for converting thorium 232 into uranium 233.

Other objects of the present invention will become more apparent from the following description and the drawing hereby made a part of the specification wherein:

The figure is a phase diagram of the plutonium-thorium system.

PREPARATION

The alloys of this invention may be produced by several methods. Alloys containing from zero to about 50 atomic percent of thorium may be prepared by heating weighed amounts of the two components in a high purity magnesium oxide crucible by induction or radiation. (Inductive heating is to be preferred over radiative heating because the stirring action of the inductance field aids in achieving a homogeneous melt.) Alloys containing more than about 50% of thorium can be prepared by melting in thorium oxide crucibles or by the well-known technique of arc melting. All melting and alloying operations should be conducted in vacuo or in an inert atmosphere of helium or argon. For example, an alloy of 80% Th–20% Pu can be produced by placing weighed amounts (20.48 weight percent Pu) in a properly degassed thorium oxide crucible, heating in a vacuum induction furnace to about 1700° C., holding for several minutes, and cooling at the natural rate of the furnace; an alloy of 40% Th–60% Pu can be produced by placing weighed amounts (60.71 weight percent Pu) in a properly degassed magnesium oxide crucible, heating in a vacuum induction furnace to about 1100° C., holding for several minutes, and cooling at the natural rate of the furnace. Fast freezing, such as occurs in chill casting or arc melting, will eliminate the moderate tendency of these alloys to segregation.

PROPERTIES OF THE ALLOYS

This invention provides useful alloy structures for the binary plutonium-thorium alloy containing a percentage of thorium in the range from about 50 atomic percent to about 98 atomic percent. The alloy structure in the range of about 85 atomic percent to about 98 atomic percent thorium is preferred because it is substantially a single phase ($\eta$) of face-centered-cubic crystal structure.

Plutonium and thorium are miscible in all proportions in the liquid state and have limited mutual solid solubilities. They form only one intermetallic compound, $Pu_2Th$, as shown in the accompanying figure by the solid vertical line at 33 a/o Th. The solid solubility of plutonium in thorium is sufficiently high for use as a solid fuel element alloy of good fabricability; and because of its face-centered-cubic crystal structure it is resistant to radiation damage.

Again referring to the accompanying figure it is seen that the maximum solid solubility of plutonium in alpha-thorium is about 48 atomic percent at 615° C. (52 atomic percent thorium). For use as a solid fuel element at temperatures exceeding 600° C., then, the plutonium content must be less than 48 atomic percent. The solidus line (temperature at which melting begins) varies more or less linearly with composition, e.g., at 30 atomic percent Pu it lies at about 900° C. and at 20 atomic percent Pu it has increased to about 1100° C.

If a maximum operating temperature of about 600° C. can be tolerated, then the amount of plutonium in the alloy can be increased, as indicated by the horizontal portion of the solidus line near 600° C. Alloys containing more plutonium than can be held in solid solution by alpha thorium, but less than the amount which would convert all the thorium to the intermediate phase $Pu_2Th$, will consist of mixtures of $Pu_2Th$ and thorium-rich solid solution. The concentration of the intermediate phase will be proportional to the amount of plutonium in excess of that held in solid solution. So long as the concentration is sufficiently low, i.e., at least about 50 atomic percent throium, so that the intermediate phase ($Pu_2Th$) is present as separate and discrete particles embedded in a matrix of thorium-rich solid solution the alloy will be fabricable and will retain to a large degree its capability of resisting radiation damage. The upper limit of about 98 atomic percent thorium is dictated by minimum plutonium concentration required to obtain a critical mass, which minimum is about 2 atomic percent.

The alloys of the present invention can be fabricated by the same general methods by which pure thorium metal is handled. Because of the solid solution hardening of thorium by plutonium and because of the dispersal of $Pu_2Th$ in the two-phase alloys, there are considerable increases in strength and hardness which require greater forces during mechanical fabrication, such as rolling. However, the machineability is improved over that of pure thorium.

The intermediate phase $Pu_2Th$ is in itself only moderately hard, having a diamond pyramid hardness number of about 190, and is not excessively brittle. It is present in the alloys of the present invention as a dispersed phase and its presence is not undesirable from a mechanical standpoint.

The extent of hardening of thorium by solid solution of plutonium is summarized in the following table:

*Table I*

| Composition (atomic percent Th) | Approx. diamond pyramid hardness No. (25 g. load) |
|---|---|
| 100 | 58 |
| 90 | 85 |
| 80 | 97 |
| 70 | 105 |
| 60 | 110 |

GENERAL CONSIDERATIONS

When the alloy of the present invention is used in a reactor the volume of the material in which the heat is generated can be considerably increased over the volume available when pure plutonium is used. If the alloys of the present invention are utilized in a fast reactor as described in the above-referenced LA–1679, the fuel rods will be increased in an amount which can be determined by methods well-known in the art. In that particular design the added fuel rods can be placed in a volume gained by using fewer uranium rods within the fuel cage. In other reactors using plutonium as a fuel, it is apparent that the fuel cavity can be designed to accommodate the fuel volume required for the various plutonium-thorium alloys of the present invention with only skill-of-the-art modifications.

Therefore, the present invention is not limited by the foregoing specification, but only by the following claims which recognize the variations within the spirit of this invention.

What is claimed is:

1. A binary alloy consisting essentially of from about 50 to about 98 atomic percent thorium and the balance plutonium.

2. A binary alloy consisting essentially of from about 85 to about 98 atomic percent thorium and the balance plutonium.

References Cited in the file of this patent

Poole et al.: "A Preliminary Investigation of the Plutonium-Thorium System," AERE–M/R–2156. Atomic Energy Research Est. Harwell, Berkshire, England, April 1957.